(12) United States Patent
Gilbert et al.

(10) Patent No.: US 6,657,007 B2
(45) Date of Patent: Dec. 2, 2003

(54) CLEARCOAT COMPOSITION WITH IMPROVED ADHESION

(75) Inventors: John A. Gilbert, Beverly Hills, MI (US); Donald H. Campbell, Hartland, MI (US); Vincent Cook, Münster (DE)

(73) Assignee: BASF Corporation, Southfield, MI (US)

(*) Notice: Subject to any disclaimer, the term of this patent is extended or adjusted under 35 U.S.C. 154(b) by 0 days.

(21) Appl. No.: 10/017,442

(22) Filed: Dec. 14, 2001

(65) Prior Publication Data

US 2002/0107325 A1 Aug. 8, 2002

Related U.S. Application Data

(63) Continuation-in-part of application No. 09/677,063, filed on Sep. 29, 2000, now Pat. No. 6,531,560.

(51) Int. Cl.[7] .................................................. C08F 8/30
(52) U.S. Cl. ...................... 525/124; 525/185; 525/187; 525/190; 525/131; 525/312; 526/217; 526/236; 526/301; 526/302; 526/312; 526/320
(58) Field of Search ................................ 526/217, 236, 526/301, 302, 312, 320; 525/124, 131, 185, 190, 312

(56) References Cited

U.S. PATENT DOCUMENTS

| | | | |
|---|---|---|---|
| 4,758,632 A | 7/1988 | Parekh et al. | 525/383 |
| 4,814,382 A | 3/1989 | Hoy et al. | 525/113 |
| 5,356,669 A | 10/1994 | Rehfuss et al. | 427/407.1 |
| 5,412,049 A | 5/1995 | Argyropoulos et al. | 526/312 |
| 5,593,785 A | 1/1997 | Mayo et al. | 428/423.1 |
| 5,866,259 A | 2/1999 | Harris et al. | 428/424.4 |
| 5,872,195 A | 2/1999 | Green et al. | 525/481 |
| 5,907,024 A | 5/1999 | Ohrbom et al. | 528/75 |
| 5,945,499 A | 8/1999 | Ohrbom et al. | 528/75 |
| 6,291,073 B1 | 9/2001 | Ohrbom et al. | 428/423.1 |

FOREIGN PATENT DOCUMENTS

| | | | |
|---|---|---|---|
| EP | 0 099 335 A1 | 7/1983 | B22C/1/10 |
| EP | 0 594 068 A1 | 10/1993 | C09D/201/02 |
| EP | 0 718 332 A1 | 12/1995 | C08G/18/28 |
| EP | 0 739 963 A2 | 4/1996 | C09J/4/00 |
| EP | 0 915 113 | 11/1998 | C08G/18/38 |
| EP | 0 995 778 | 10/1999 | C09D/7/06 |
| GB | 1 338 632 | 6/1970 | B32B/27/06 |
| WO | WO 00/26313 | 5/2000 | C09D/201/02 |

OTHER PUBLICATIONS

Derwent Publication Ltd.., London, GB; AN 1999–224375, & JP 11 058612 A (Daito Chemitronics KK) Mar. 2, 1999, XP–002172439.

International Search Report for PCT/US00/26905, Sep. 29, 2000, pp. 1–7.

BASF Corp., USSN 09/741,511, Dec. 19, 2000, entitled Coating compositions containing crosslinkable monomeric difunctional compounds having a least thirty carbon atoms, pp. 1–25.

BASF Corp., et al., International Search Report PCT/US02/29486 filed Sep. 16, 2002.

*Primary Examiner*—Helen L. Pezzuto

(57) ABSTRACT

Clearcoat coating composition for automotive exterior coatings with improved intercoat adhesion to a subsequently applied coating layer and improved flexibility contains (a) a first vinyl copolymer prepared from a monomer mixture including no more than about 35% by weight of nonfunctional monomers that has carbamate functionality and hydroxyl functionality, at least part of the hydroxyl functionality being on monomer units including an optionally branched alkyl group having at least about six carbon atoms; (b) a second vinyl copolymer having hydroxyl functionality, preferably primary hydroxyl functionality; and (c) a curing agent component that includes at least an aminoplast curing agent and optionally a polyisocyanate curing agent. The polyisocyanate curing agent is preferably blocked with a blocking agent that volatilizes during the cure reaction, regenerating a reactive isocyanate group.

37 Claims, No Drawings

CLEARCOAT COMPOSITION WITH IMPROVED ADHESION

CROSS-REFERENCE TO RELATED APPLICATIONS

This application is a continuation-in-part of U.S. patent application Ser. No. 09/677,063 filed on Sep. 29, 2000, now U.S. Pat. No. 6,531,560 the disclosure of which is incorporated herein by reference.

FIELD OF THE INVENTION

This invention concerns thermoset clearcoat compositions, especially for automotive vehicles.

BACKGROUND OF THE INVENTION

Clearcoat-basecoat composite coatings are widely used in the coatings art and are notable for desirable gloss, depth of color, distinctness of image and/or special metallic effects. Composite systems are particularly utilized by the automotive industry to achieve advantageous visual effects, especially a high degree of clarity. However, a high degree of clarity in the clearcoat makes it easier to observe defects. Defects resulting from environmental etch are particularly disadvantageous. Environmental etch is a phenomenon which manifests as spots or marks on or in the clearcoat which are removed only with loss of clearcoat.

Clearcoat compositions containing carbamate-functional acrylic polymers have been disclosed by the prior art as a solution to the problem of environmental etch. While such polymers and compositions containing them provide a significant improvement over the prior art, improvements in some areas are still desirable. In particular, it would be advantageous to provide polymers exhibiting improved adhesion while still possessing the positive environmental etch and performance characteristics of carbamate-functional acrylics. Improvements are particularly desired with respect to adhesion of the polymer-containing composition to one or more subsequently applied coatings that may be applied to correct minor defects or flaws. Adhesion failures resulting from a weak bond between the original clearcoat layer and a subsequently applied coating, also known as an intercoat adhesion failure, are undesirable, particularly for automotive OEM clearcoats.

U.S. Pat. No. 5,412,049 discloses acrylic copolymers of hydroxyalkyl (meth)acrylates and (meth)acrylate esters of hydroxyalkyl carbamates, optionally with other comonomers in amounts of up to 90 weight percent. The '049 patent does not disclose how to improve intercoat adhesion, however. U.S. Pat. No. 5,356,669 also describes carbamate-functional acrylic polymers. The acrylic polymers of the '669 patent may contain 10 to 90 weight percent of non-functional comonomers. This reference also does not discuss how to improve intercoat adhesion.

Flexibility is also an important property when the clearcoat is applied over a flexible substrate, such as a vehicle bumper. Coating compositions optimized for environmental etch resistance often do not provide the desired degree of flexibility, especially for acrylic polymers having carbamate functionality that are cured with aminoplast curing agents.

SUMMARY OF THE INVENTION

The clearcoat coating composition for automotive exterior coatings of the present invention provides intercoat adhesion to a subsequently applied coating layer and also provides improved flexibility over earlier environmental etch resistant clearcoats. The clearcoat composition of the invention contains a first vinyl copolymer prepared from a monomer mixture including no more than about 35% by weight of nonfunctional monomers. "Nonfunctional monomers" are monomers that do not have functional groups reactive with the crosslinker or curing agent component. The first vinyl copolymer has carbamate functionality and hydroxyl functionality. A carbamate group according to the invention may be represented by the structure

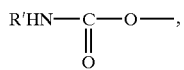

in which R' is H or alkyl. Preferably, R' is H or alkyl of from 1 to about 4 carbon atoms, and more preferably R' is H (a primary carbamate). At least a part, preferably all, of the monomer units bearing hydroxyl groups include an alkyl group, optionally branched, having at least about six carbon atoms.

The clearcoat composition further includes a second vinyl copolymer having hydroxyl functionality, preferably primary hydroxyl functionality. A primary hydroxyl group according to the invention is a hydroxyl group bound to a carbon that is bound to only one carbon atom.

The clearcoat composition also has a curing agent component that includes at least an aminoplast curing agent and optionally a polyisocyanate curing agent. The polyisocyanate curing agent is preferably blocked with a blocking agent that volatilizes during the cure reaction, regenerating a reactive isocyanate group.

DETAILED DESCRIPTION OF THE PREFERRED EMBODIMENTS

The following description of the preferred embodiment(s) is merely exemplary in nature and is in no way intended to limit the invention, its application, or uses.

The clearcoat composition of the invention contains a first vinyl copolymer prepared from a monomer mixture including no more than about 35%, preferably no more than about 20%, and particularly preferably no more than about 10%, by weight of nonfunctional monomers. The first vinyl copolymer has carbamate functionality and hydroxyl functionality. A carbamate group according to the invention may be represented by the structure

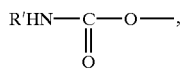

in which R' is H or alkyl. Preferably, R' is H or alkyl of from 1 to about 4 carbon atoms, and more preferably R' is H (a primary carbamate). Preferably, from about 65% by weight to about 100% of the monomeric units of the polymer have at least one of the carbamate and hydroxyl groups.

In general, an acrylic polymer with carbamate or urea groups may be prepared in two ways. First, the acrylic polymer with carbamate or urea groups may be prepared by polymerization using a monomer having a carbamate or urea group. Secondly, the acrylic polymer may be prepared by polymerization of a monomer having functionality that can be converted to or adducted with carbamate or urea functionality after polymerization. Any of the methods described in U.S. Pat. No. 6,160,058, the disclosure of which is incorporated herein by reference, may be used.

In the first method, the acrylic polymer is prepared by polymerization of a monomer having carbamate or urea groups. For example, U.S. Pat. No. 5,412,049, incorporated herein by reference, discloses polymerization of the reaction product of an hydroxyl (meth)acrylate ester of an hydroxyalkyl carbamate compound.

In another embodiment of the first method, the acrylic polymer may be polymerized with a β-hydroxy carbamate monomer having the structure

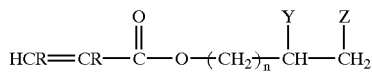

in which either each R is hydrogen or one R is hydrogen and the other R is methyl; n is from 1 to about 4, preferably 1; and one of Y and Z is OH and the other of Y and Z is a carbamate or urea group as already defined. In a typical synthesis of such a monomer, the reaction kinetics produces a product that is a mixture of the compounds in which Y is hydroxyl and Z is hydroxyl. When Y is the hydroxyl group, the monomer also provides an hydroxyl group for the acrylic polymer.

One way of preparing a β-hydroxy carbamate monomer of this structure is by reacting a glycidyl-group containing polymerizable monomer first with carbon dioxide to convert the oxirane group to a cyclic carbonate group, and then with ammonia or a primary amine to convert the cyclic carbonate group to a β-hydroxy carbamate group. Examples of suitable oxirane group-containing polymerizable monomers include, without limitation, glycidyl acrylate, glycidyl methacrylate, glycidyl crotonate, and allyl glycidyl ether. Oxirane groups can be converted to carbamate groups by first converting to a cyclic carbonate group by reaction with $CO_2$. This can be done at any pressure from atmospheric up to supercritical $CO_2$ pressures, but is preferably under elevated pressure (e.g., 60–150 psi). The temperature for this reaction is preferably 60–150° C. Useful catalysts include any that activate an oxirane ring, such as tertiary amine or quaternary salts (e.g., tetramethyl ammonium bromide), combinations of complex organotin halides and alkyl phosphonium halides (e.g., $(CH_3)_3SnI$, $Bu_4SnI$, $Bu_4PI$, and $(CH_3)_4PI$), potassium salts (e.g., $K_2CO_3$, KI) preferably in combination with crown ethers, tin octoate, calcium octoate, and the like. The cyclic carbonate group is reacted with ammonia or a primary amine. The primary amine preferably has up to four carbons, e.g. methyl amine. Preferably, the cyclic carbonate is reacted with ammonia. The ammonia may be aqueous ammonia (i.e., $NH_4OH$). The reaction ring-opens the cyclic carbonate to form a β-hydroxy carbamate monomer.

Another method of preparing a carbamate-functional monomer is by reacting a hydroxy-functional, ethylenically unsaturated monomer with cyanic acid, which may be formed by the thermal decomposition of urea. A further method is by reacting an isocyanate-functional or acid-functional ethylenically unsaturated monomer with a hydroxyalkyl carbamate compound, such as hydroxypropyl carbamate, or with a hydroxy-containing epoxide compound with the epoxide group being subsequently converted to a carbamate group as described above. In a still further method, an hydroxyl-functional ethylenically unsaturated monomer may be reacted with an alkyl carbamate in a transesterification reaction to introduce the carbamate group. Another way to form a carbamate-functional, ethylenically unsaturated monomer is by reacting an acid-functional, ethylenically unsaturated monomer with an epihalohydrin compound, then reacting the oxirane group with carbon dioxide to form the carbonate, then reacting the carbonate ring with ammonia or a primary amine to form a primary carbamate or secondary carbamate, respectively. Yet another technique involves formation of a hydroxyalkyl carbamate by reacting a primary or secondary amine or diamine with a cyclic carbonate such as ethylene carbonate. The hydroxyl group on the hydroxyalkyl carbamate is then esterified by reaction with acrylic or methacrylic acid to form the monomer. Further details of synthesizing monomers having carbamate functionality are described, for example, in U.S. Pat. Nos. 3,479,328, 3,674,838, 4,126,747, 4,279,833, 4,340,497, and 5,356,669 and WO 94/10211, the disclosures of each of which are incorporated herein by reference.

In the second method, a vinyl polymer is prepared having a functional group that is reacted after polymerization to provide a carbamate or urea group. U.S. Pat. Nos. 4,758,632 and 5,356,669, the disclosures of each of which are incorporated herein by reference, describe preparing a polymer backbone having appended thereto at least one carbamate-functional group in this way. One technique involves thermally decomposing urea (to give off ammonia and HNCO) or cyanuric acid in the presence of a hydroxy-functional vinyl polymer to form a carbamate-functional vinyl polymer. Another technique involves reacting the hydroxyl group of a hydroxyalkyl carbamate with isocyanate groups or carboxylic acid groups on the acrylic polymer. Isocyanate-functional acrylics are prepared by polymerization of Isocyanate vinyl monomers, which include unsaturated m-tetramethyl xylene isocyanate and isocyanatoethyl methacrylate. Examples of carboxylic acid functional vinyl polymers include those prepared by polymerization of acrylic acid, methacrylic acid, crotonic acid, and maleic anhydride which is hydrolyzed after synthesis. Yet another technique is to react the cyclic carbonate group on a cyclic carbonate-functional polymer with ammonia or a primary amine to form the carbamate-functional acrylic. Cyclic carbonate-functional acrylic polymers are known in the art and are described, for example, in U.S. Pat. No. 2,979,514, the disclosure of which is incorporated herein by reference. Another technique is to transcarbamylate a hydroxy-functional polymer with an alkyl carbamate. A more difficult, but feasible way of preparing the polymer would be to trans-esterify a polymer with a hydroxyalkyl carbamate. A further method is to react a glycidyl group-containing polymer with carbon dioxide to produce a cyclic carbonate group, and then with ammonia or a primary amine as before to provide the carbamate functionality. Glycidyl-group containing acrylic polymers can be produced by copolymerizing glycidyl acrylate, glycidyl methacrylate, or allyl glycidyl ether, for example.

The hydroxyl groups according to the invention are preferably part of a moiety having the structure

or the structure

in which R is an alkyl or cycloalkyl group, optionally substituted, having preferably about 6 to about 17 carbon atoms, and is preferably branched. The hydroxyl-containing moiety may be obtained by reaction of a carboxylic acid group with an epoxide ether or an epoxide ester, with either the carboxylic acid group or the epoxide group being bound to the polymer. In another embodiment, the hydroxyl groups are part of a moiety having a structure

in which R is an alkyl or cycloalkyl group, optionally substituted, having preferably about 4 to about 18 carbon atoms, and is preferably branched. In yet another embodiment, an optionally substituted cyclohexene oxide compound is reacted with a carboxylic acid group bound to the polymer to provide the hydroxyl functionality.

The monomer unit having the hydroxyl moiety may be obtained by polymerization of a carboxylic acid functional ethylenically unsaturated monomer or glycidyl functional ethylenically unsaturated monomer, followed by reaction of the acid group on the vinyl polymer with a glycidyl ester or glycidyl ether compound or by reaction of the glycidyl group on the vinyl polymer with a carboxylic acid. Alternatively, the carboxylic acid functional ethylenically unsaturated monomer may be reacted with the glycidyl ester or glycidyl ether compound or the glycidyl functional ethylenically unsaturated monomer may be reacted with the carboxylic acid before polymerization of the vinyl polymer.

In a preferred embodiment, the monomer unit having the hydroxyl moiety has one of the structures:

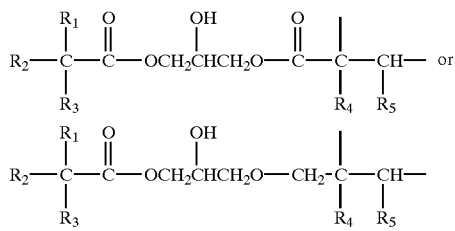

in which $R_1$, $R_2$, and $R_3$ are alkyl groups, preferably at least one of which is methyl, having a total of at least 8 carbon atoms, preferably up to about 16 carbon atoms preferably from 8 carbons to about 10 carbon atoms; and $R_4$ and $R_5$ are either both H or one of $R_4$ and $R_5$ is a methyl group and the other is H.

In one preferred embodiment, the monomer unit is the polymerization product of the condensation product of a polymerizable acid and glycidyl esters of a mixture of tertiary acids having 9 to 11 carbon atoms having at least one methyl group on the α-carbon (e.g., $R_1$, $R_2$, and $R_3$ of the above structure are alkyl groups having a total of from 8 carbons to 10 carbon atoms, at least one of which is a methyl group). In an alternative preferred embodiment, the monomer unit is the polymerization product of the condensation product of a polymerizable glycidyl ester or ether and a mixture of tertiary acids having 9 to 11 carbon atoms having at least one methyl group on the α-carbon (e.g., $R_1$, $R_2$, and $R_3$ of the above structure are alkyl groups having a total of from 8 carbons to 10 carbon atoms. at least one of which is a methyl group). Mixtures of tertiary acids having 9 to 11 carbon atoms having at least one methyl group on the α-carbon are available under the trademark VERSATIC® acid, and the glycidyl ester of VERSATIC® acid (also commonly called neodecanoic acid) is available under the brand name CARDURA™ Resin E-10 from Resolution Performance Products, Houston, Tex. Examples of polymerizable acids include, without limitation, acrylic acid, methacrylic acid, crotonic acid, fumaric acid, maleic acid, and itaconic acid, and monoalkyl esters of the difunctional acids. Examples of polymerizable glycidyl esters and ethers include, without limitation, glycidyl acrylate, glycidyl methacrylate, and allyl glycidyl ether.

The hydroxyl functionality may also be prepared by reacting a pendant carboxylic acid group with an olefinic epoxide. Olefinic epoxides may be prepared by reacting a compound containing a double bond with peroxide or peracetic acid under conditions known in the art. Preferred olefinic epoxides are aliphatic, including cycloaliphatic, compounds having at least six carbon atoms. Examples of these include, without limitation, 1,2-hexylene oxide, 1,2-dodecylene oxide, and cyclohexylene oxide.

The clearcoat composition further includes a second vinyl copolymer having primary hydroxyl functionality. The second vinyl polymer may be obtained using a monomer having primary hydroxyl functionality, examples of which include, without limitation, hydroxyethyl acrylate, hydroxyethyl methacrylate, 3-hydroxypropyl acrylate, 3-hydroxypropyl methacrylate, 4-hydroxybutyl acrylate, and 4-hydroxybutyl methacrylate.

The second vinyl copolymer having hydroxyl functionality preferably has a theoretical glass transition temperature, as determined using the Fox equation, of from −50° C. to 100° C., more preferably from about 0° C. to about 50° C. The second vinyl copolymer should have an equivalent weight of about 250 to about 400 grams per equivalent.

The vinyl polymer having hydroxyl functionality and the vinyl polymer having the carbamate and hydroxyl functionality may be polymerized using one or more comonomers. Examples of such comonomers include, without limitation, α,β-ethylenically unsaturated monocarboxylic acids containing 3 to 5 carbon atoms such as acrylic, methacrylic, and crotonic acids and the esters of those acids; α,β-ethylenically unsaturated dicarboxylic acids containing 4 to 6 carbon atoms and the anhydrides, monoesters, and diesters of those acids; vinyl esters, vinyl ethers, vinyl ketones, and aromatic or heterocyclic aliphatic vinyl compounds. Representative examples of suitable esters of acrylic, methacrylic, and crotonic acids include, without limitation, those esters from reaction with saturated aliphatic and cycloaliphatic alcohols containing 1 to 20 carbon atoms, such as methyl, ethyl, propyl, isopropyl, n-butyl, isobutyl, tert-butyl, 2-ethylhexyl, lauryl, stearyl, cyclohexyl, trimethylcyclohexyl, tetrahydrofurfuryl, stearyl, sulfoethyl, and isobornyl acrylates, methacrylates, and crotonates. Representative examples of other ethylenically unsaturated polymerizable monomers include, without limitation, such compounds as fumaric, maleic, and itaconic anhydrides, monoesters, and diesters with alcohols such as methanol, ethanol, propanol, isopropanol, butanol, isobutanol, and tert-butanol. Representative examples of polymerization vinyl monomers include, without limitation, such compounds as vinyl acetate, vinyl propionate, vinyl ethers such as vinyl ethyl ether, vinyl and vinylidene halides, and vinyl ethyl ketone. Representative examples of aromatic or heterocyclic aliphatic vinyl compounds include, without limitation, such compounds as styrene, α-methyl styrene, vinyl toluene, tert-butyl styrene, and 2-vinyl pyrrolidone. The comonomers may be used in any combination.

The vinyl polymers may be prepared using conventional techniques, such as by heating the monomers in the presence of a polymerization initiating agent and optionally chain transfer agents. The polymerization is preferably carried out in solution, although it is also possible to polymerize the acrylic polymer in bulk. Suitable polymerization solvents include, without limitation, esters, ketones, ethylene glycol monoalkyl ethers and propylene glycol monoalkyl ethers, alcohols, and aromatic hydrocarbons.

Typical initiators are organic peroxides such as dialkyl peroxides such as di-t-butyl peroxide, peroxyesters such as t-butyl peroctoate and t-butyl peracetate, peroxydicarbonates, diacyl peroxides, hydroperoxides such as t-butyl hydroperoxide, and peroxyketals; azo compounds such as 2,2'azobis(2-methylbutanenitrile) and 1,1'-azobis (cyclohexanecarbonitrile); and combinations of these. Typical chain transfer agents are mercaptans such as octyl mercaptan, n- or tert-dodecyl mercaptan; halogenated compounds, thiosalicylic acid, mercaptoacetic acid, mercaptoethanol, and dimeric alpha-methyl styrene.

The solvent or solvent mixture is generally heated to the reaction temperature and the monomers and initiator(s) and optionally chain transfer agent(s) are added at a controlled rate over a period of time, typically from about two to about six hours. The polymerization reaction is usually carried out at temperatures from about 20° C. to about 200° C. The reaction may conveniently be done at the temperature at which the solvent or solvent mixture refluxes, although with proper control a temperature below the reflux may be maintained. The initiator should be chosen to match the temperature at which the reaction is carried out, so that the half-life of the initiator at that temperature should preferably be no more than about thirty minutes, more preferably no more than about five minutes. Additional solvent may be added concurrently. The mixture is usually held at the reaction temperature after the additions are completed for a period of time to complete the polymerization. Optionally, additional initiator may be added to ensure complete conversion of monomers to polymer.

The vinyl polymers should have a weight average molecular weight of at least about 2400, preferably at least about 3000, more preferably at least about 3500, and particularly preferably at least about 4000. Weight average molecular weight may be determined by gel permeation chromatography using polystyrene standard. In addition, the weight average molecular weight is preferably up to about 7000, more preferably up to about 5000, and still more preferably up to about 4500.

The clearcoat coating composition preferably includes from about 50% to about 85%, more preferably from about 60% to about 75% by weight of the first vinyl polymer having carbamate functionality, based on the vehicle weight. The "vehicle weight" is the total weight of the thermoset, film-forming components in the coating composition. The clearcoat coating composition preferably includes from about 5% to about 40%, more preferably from about 15% to about 30% by weight of the second vinyl polymer having hydroxyl functionality, based on the vehicle weight.

The clearcoat coating composition further includes curing agent component that includes at least an aminoplast curing agent and optionally a polyisocyanate curing agent. Aminoplast crosslinkers have active methylol or methylalkoxy groups. Examples of preferred aminoplast curing agent compounds include melamine formaldehyde crosslinkers, including monomeric or polymeric melamine resin and partially or fully alkylated melamine resin, urea resins, and methylol ureas such as urea formaldehyde resin, alkoxy ureas such as butylated urea formaldehyde resin. The clearcoat composition further includes a polyisocyanate curing agent, which preferably is blocked.

The polyisocyanate crosslinking agent is preferably an aliphatic, including cycloaliphatic, polyisocyanate. Examples include, without limitation, 1,2-diisocyantopropane, 1,3-diisocyanatopropane, 1,2-diisocyanatobutane, 1,3-diisocyanatobutane, 1,4-diisocyanatobutane, 2,3-diisocyanatobutane, 1,6-diisocyanatohexane, 4,4'-methylenebis(cyclohexyl isocyanate), isophorone diisocyanate, diisocyanatocylcohexane, 1,5-diisocyanatopentane, 2,2,4- and 2,4,4-trimethylhexamethylene diisocyanate, and biurets, isocyanurates, and allophonates of these. Isocyanurates are particularly preferred.

An isocyanate crosslinker may also be formed by reacting one mole of a polyisocyanate compound per equivalent of a polyol compound. For example, useful crosslinking agents can be made by reacting two equivalents of a diisocyanate such as hexamethylenediisocyanate with one equivalent of a polyol such as neopentyl glycol, trimethylolpropane, triethylolpropane, glycerol, or pentaerythritol. the reaction between polyisocyanate and polyol may be carried out neat or in solution, and may optionally use a catalyst, such as an organotin catalyst like dibutyltin dilaurate or dibutyltin diacetate.

The polyisocyanate crosslinking agents are preferably blocked with compounds such as phenols, caprolactam, low molecular weight oximes such as acetone oxime, methyl ethyl ketoxime, cyclohexanone oxime, acetophenone oxime and so on, and pyrazole and substituted pyrazole compounds such as dimethyl pyrazole that will allow the polyisocyanate crosslinking agent to be formulated into a stable one package (also called one component or 1K) composition. Blocking agent having relatively low unblocking temperatures (e.g., 250° F. to 300° F.) are preferred.

The clearcoat composition includes preferably at least about 10% by weight, more preferably at least about 15% by weight, of the aminoplast crosslinker, based on the vehicle weight. The clearcoat composition includes preferably up to about 35% by weight, more preferably up to about 25% by weight, of the aminoplast crosslinker, based on the vehicle weight. The clearcoat composition includes preferably at least about 3% by weight, more preferably at least about 5% by weight, of the polyisocyanate crosslinker, based on the vehicle weight. The clearcoat composition includes preferably up to about 25% by weight, more preferably up to about 20% by weight, of the polyisocyanate crosslinker, based on the vehicle weight.

The clearcoat coating composition may include one or more catalysts to enhance the cure reaction, and preferably include at least one catalyst for the aminoplast curing agent reaction and one catalyst for the polyisocyanate curing agent reaction. Suitable catalysts for the aminoplast curing agent reactions include, without limitation, alkylsulfonic acids, arylsulfonic acid, and alkylarylsulfonic acids, such as methane sulfonic acid, p-toluene sulfonic acid, dinonylnaphthalene disulfonic acid, dodecylbenzenesulfonic acid; phosphoric acid and its esters such as phenyl acid phosphate, butyl phosphate, and hydroxy phosphate esters; monobutyl maleate, boron trifluoride etherate, trimellitic acid, and triflic acid. Strong acid catalysts are often blocked, e.g. with an amine. Suitable catalysts for the polyisocyanate curing agent reactions include, without limitation, zinc compounds such as zinc octanoate, tin compounds such as stannous octanoate, dibutyltin dilaurate, dibutyltin diacetate, dibutyltin oxide, bismuth compounds such as bismuth octoate, and so on.

The clearcoat coating composition may include further carbamate-functional compounds. Such carbamate-functional compounds include, without limitation, any of those described in U.S. Pat. Nos. 6,160,058, 6,084,038, 6.080.825, 5,994,479, the disclosures of which are incorporated by reference. In particular, the composition may include a carbamate-functional or urea-functional material comprising at least two functional groups, at least one of which is a carbamate or urea group that is the reaction product of (1) an hydroxyl group of a first compound that is the result of a ring-opening reaction between a compound with an epoxy group and a compound with an organic acid group and (2) cyanic acid or a carbamate or urea group-containing compound.

In another embodiment, the clearcoat composition may include a carbamate-functional or urea-functional material that is the reaction product of (1) a compound comprising a carbamate or urea group and an active hydrogen group that is reactive with (2), and (2) a lactone or a hydroxy carboxylic acid. In a particularly preferred embodiment, the active hydrogen group of compound (1) is an hydroxyl group and the compound (2) is ε-caprolactone. The compound (1) may be, for example and without limitation, hydroxyethyl carbamate, hydroxypropyl carbamate, or hydroxybutyl carbamate.

In another embodiment, the clearcoat composition may include a carbamate-functional or urea-functional material that is the reaction product of a first material (A) that is prepared by reacting (1) a compound comprising a primary carbamate or primary urea group and an hydroxyl group and (2) a lactone or a hydroxy carboxylic acid, as just described, further reacted with a second material (B) that is reactive with hydroxyl groups on a plurality of molecules of compound (1), but that is not reactive with the carbamate or urea groups on compound (1). For example, the compound (B) may be a polyisocyanate, especially an isocyanate, particularly the isocyanurate of isophorone diisocyanate. Again, the compound (2) is preferably ε-caprolactone.

In yet another embodiment, the clearcoat composition may include a carbamate-functional or urea-functional material that is the reaction product of a first material (A) that is prepared by reacting (1) a compound comprising a primary carbamate or primary urea group and an hydroxyl group and (2) a lactone or a hydroxy carboxylic acid, as just described, further reacted with a second material or materials (B) that converts an hydroxyl group on the reaction product to a carbamate group, or a component comprising a group that is reactive with a hydroxyl group and a carbamate or urea group or group that can be converted to carbamate or urea. The hydroxyl group can be reacted, for example, without limitation, with monoisocyanates such as methyl isocyanate and butyl isocyanante, which react to form a secondary carbamate group; cyanic acid (which can be formed by the thermal decomposition of urea), which reacts with hydroxyl groups to form a primary carbamate group; or phosgene, followed by reaction with ammonia (primary carbamate group) or a primary amine (secondary carbamate group).

In another embodiment, the clearcoat may further include a carbamate-functional or urea-functional material that is the reaction product of (1) a compound comprising a primary carbamate or primary urea group and an hydroxyl group and (2) a compound that is reactive with hydroxyl groups on a plurality of molecules of compound (1), but that is not reactive with the carbamate or urea groups on compound (1). The compound (1) may be, for example and without limitation, hydroxyethyl carbamate, hydroxypropyl carbamate, or hydroxybutyl carbamate. The compound (2) is preferably a diisocyanate, triisocyanate, isocyanurate or biuret thereof, mixture of such compounds. Particularly preferred compounds (2) are the isocyanurate of isophorone diisocyanate and the isocyanurate of hexamethylene diisocyanate.

In another preferred embodiment, the clearcoat composition includes a carbamate-functional or urea-functional material that is the reaction product of (1) a first material that is the reaction product of a mixture including at least a polyisocyanate and an active hydrogen-containing chain extension agent with (2) a compound comprising a group that is reactive with said first material and a carbamate group or group that can be converted to carbamate. Suitable examples of the material (1) include, without limitation, the reaction product of a mixture including at least one of a diisocyanate, triisocyanate, isocyanurate or biuret thereof, mixture of such compounds, and at least one chain extension agent selected from 1,6-hexanediol, cyclohexanedimethylol, 2-ethyl-1,6-hexanediol, 3-hydroxy-2,2-dimethylpropyl 3-hydroxy-2,2-dimethylpropionate, 1,4-butanediol, and mixtures thereof. Suitable examples of compound (2) include, without limitation, hydroxyethyl carbamate, hydroxybutyl carbamate, hydroxypropyl carbamate, and combinations of these.

In a preferred embodiment, the clearcoat coating composition may further include a material as described in co-pending U.S. patent application Ser. No. 09/741,511, filed Dec. 19, 2000, incorporated herein by reference. The clearcoat coating composition particularly includes a carbamate-functional material having at least two carbamate groups, preferably two to four carbamate groups, and more preferably two carbamate groups and a hydrocarbon moiety with about 24 to about 72 carbon atoms, preferably about 36 to about 72 carbon atoms, and more preferably about 36 to about 54 carbon atoms, and particularly preferably about 36 carbon atoms. The hydrocarbon moiety may include cycloaliphatic or aromatic structures. Such materials may be prepared, for example, by addition reaction of unsaturated monofunctional fatty acids having 12 to 18 carbon atoms according to known methods, followed by conversion of the acid group to a carbamate group. The unsaturated fatty acids may be dimerized, trimerized, or tetramerized. Higher oligomer products are also possible, but not preferred. The acid groups may be converted to carbamate or urea groups by a number of known means. For example, the acid may be reduced to an alcohol group and then the alcohol group reacted with a hydroxy carbamate or urea compound such as hydroxypropyl carbamate or hydroxyethylene ethyl urea to introduce the carbamate functionality. Another method of synthesis involves reaction of an hydroxyl group with cyanic acid (which may be formed by the thermal decomposition of urea). Hydroxyl groups can also be converted to carbamate groups by reaction with low molecular weight monoisocyanates (e.g., methyl isocyanate, ethyl isocyanate, propyl isocyanate, and butyl isocyanate). An hydroxyl group can also be reacted with phosgene and then ammonia or a primary amine to form a carbamate group.

Preferred examples of such materials include compounds of the following structures:

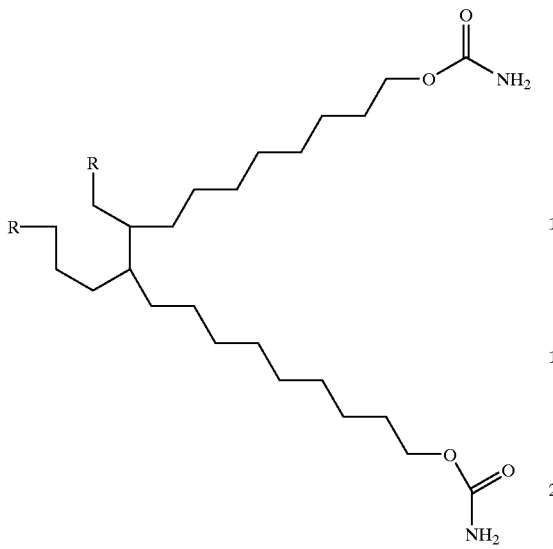

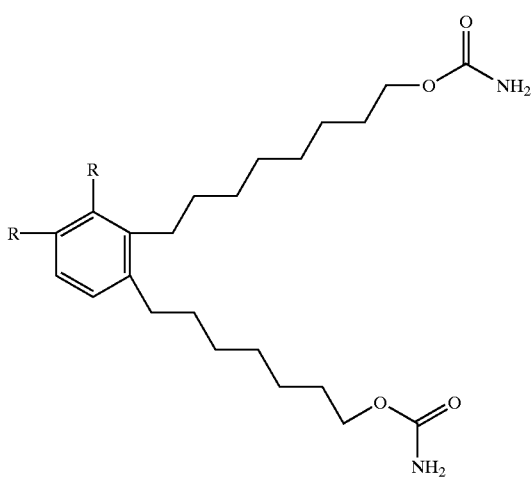

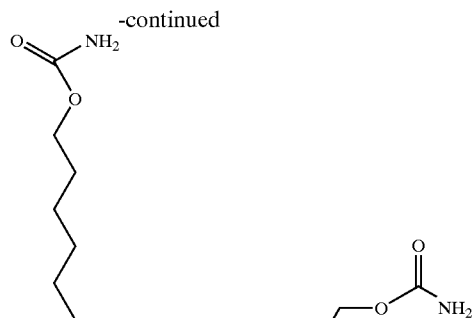

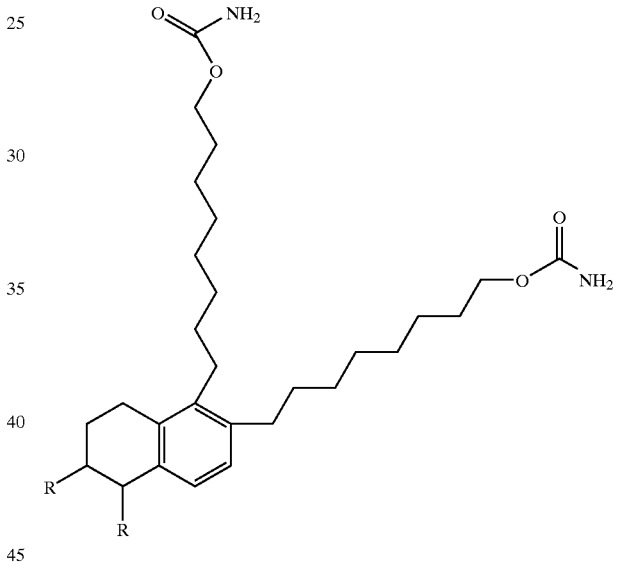

R=C$_5$–C$_8$ wherein each R group is independently an alkyl of 5 to 8 carbon atoms.

Any of these additional carbamate-functional materials may be included in the clearcoat composition in an amount of up to about 35 weight percent, preferably from about 5 weight percent to about 20 weight percent, based on the vehicle weight.

A solvent or solvents may be utilized in the clearcoat coating composition. In general, the solvent can be any organic solvent and/or water. In one preferred embodiment, the solvent includes a polar organic solvent. More preferably, the solvent includes one or more organic solvents selected from polar aliphatic solvents or polar aromatic solvents. Still more preferably, the solvent includes a ketone, ester, acetate, aprotic amide, aprotic sulfoxide, aprotic amine, or a combination of any of these. Examples of useful solvents include, without limitation, methyl ethyl ketone, methyl isobutyl ketone, m-amyl acetate, ethylene glycol butyl ether-acetate, propylene glycol monomethyl ether acetate, xylene, N-methylpyrrolidone, blends of aromatic hydrocarbons, and mixtures of these. In another preferred embodiment, the solvent is water or a mixture of water with small amounts of co-solvents.

Additional agents, for example surfactants, stabilizers, wetting agents, rheology control agents, dispersing agents, adhesion promoters, UV absorbers, hindered amine light stabilizers, etc. may be incorporated into the coating composition. While such additives are well-known in the prior art, the amount used must be controlled to avoid adversely affecting the coating characteristics.

Coating compositions can be coated on the article by any of a number of techniques well-known in the art. These include, for example, spray coating, dip coating, roll coating, curtain coating, and the like. For automotive body panels, spray coating is preferred.

The coating composition according to the invention is used as the clearcoat of a basecoat-clearcoat composite coating. The pigmented basecoat composition over which it is applied may any of a number of types well-known in the art, and does not require explanation in detail herein. Polymers known in the art to be useful in basecoat compositions include acrylics, vinyls, polyurethanes, polycarbonates, polyesters, alkyds, and polysiloxanes. Preferred polymers include acrylics and polyurethanes. In one preferred embodiment of the invention, the basecoat composition also utilizes a carbamate-functional acrylic polymer. Basecoat polymers may be thermoplastic, but are preferably crosslinkable and comprise one or more type of crosslinkable functional groups. Such groups include, for example, hydroxy, isocyanate, amine, epoxy, acrylate, vinyl, silane, and acetoacetate groups. These groups may be masked or blocked in such a way so that they are unblocked and available for the crosslinking reaction under the desired curing conditions, generally elevated temperatures. Useful crosslinkable functional groups include hydroxy, epoxy, acid, anhydride, silane, and acetoacetate groups. Preferred crosslinkable functional groups include hydroxy functional groups and amino functional groups.

Basecoat polymers may be self-crosslinkable, or may require a separate crosslinking agent that is reactive with the functional groups of the polymer. When the polymer comprises hydroxy functional groups, for example, the crosslinking agent may be an aminoplast resin, isocyanate and blocked isocyanates (including isocyanurates), and acid or anhydride functional crosslinking agents.

The clearcoat coating composition is generally applied wet-on-wet over a basecoat coating composition as is widely done in the industry. The coating compositions described herein are preferably subjected to conditions so as to cure the coating layers. Although various methods of curing may be used, heat-curing is preferred. Generally, heat curing is effected by exposing the coated article to elevated temperatures provided primarily by radiative and/or convection heat sources. Curing temperatures will vary depending on the particular blocking groups used in the crosslinking agents, however they generally range between 90° C. and 180° C. In a preferred embodiment, the cure temperature is preferably between 115° C. and 150° C., and more preferably at temperatures between 115° C. and 140° C. for a blocked acid catalyzed system. For an unblocked acid catalyzed system, the cure temperature is preferably between 80° C. and 100° C. The curing time will vary depending on the particular components used, and physical parameters such as the thickness of the layers; however, typical curing times range from 15 to 60 minutes, and preferably 15–25 minutes for blocked acid catalyzed systems and 10–20 minutes for unblocked acid catalyzed systems.

The invention is further described in the following example. The examples are merely illustrative and do not in any way limit the scope of the invention as described and claimed. All parts are parts by weight unless otherwise noted.

EXAMPLE IA

Preparation of a Carbamate Functional Polymer
(Resin 1A)

In a suitable reaction vessel equipped with nitrogen inlet, addition line, and reflux condenser, 267.4 parts of xylene is heated to 140° C. under an inert atmosphere. A mixture of 235.8 parts of hydroxyethyl methacrylate, 65.9 parts of styrene, 357 parts of the reaction product of glycidyl neodecanoate and acrylic acid, 79 parts of xylene and 79 parts of 2,2'-azobis(2-methylbutanenitrile) is then added to the reaction mixture over 2 hours and 40 minutes. When the add is completed, a mixture of 3.3 parts of 2,2'-azobis(2-methylbutanenitrile) and 65.9 parts of xylene is added over 1 hour. This first reaction mixture is cooled to 70° C.

To 1126 parts of this first reaction mixture is added 17.4 parts of glycidyl neodecanoate to make a second reaction mixture. The second reaction mixture is heated to 77° C. and 176.7 parts of methyl carbamate, 5.26 parts of dibutyl tin oxide, and 406 parts of toluene are added. The reaction mixture is refluxed for 13 hours. After this time, the solvent and excess unreacted materials are removed by vacuum stripping, followed by the addition of 250 parts of amyl acetate. The final resin has a nonvolatile content of 72.7% by weight and the polymer has approximately 8.5% by weight of nonfunctional monomer.

EXAMPLE IB

Preparation of a Hydroxyl Functional Polymer
(Resin 1B)

In a suitable reaction vessel equipped with nitrogen inlet, addition line, and reflux condenser, 22.9 parts amyl acetate and 2.1 parts xylene are heated to reflux under a nitrogen blanket. At reflux, the nitrogen blanket is discontinued and a mixture of 23.3 parts hydroxyethyl acrylate, 15.5 parts 2-ethylhexyl methacrylate, 1.5 parts 2-ethylhexyl acrylate, 21.7 parts cyclohexyl methacrylate and 2.5 parts xylene is added simultaneously with a mixture of 7.1 parts t-butylperoxy acetate and 0.8 parts amyl acetate over four hours. After the additions are complete, the add lines are flushed with 1.2 parts xylene and then the reaction mixture is maintained at 133–137 C. for one hour. The reaction mixture is then cooled and reduced to 65% by weight nonvolatiles with amyl acetate.

EXAMPLE 2

Preparation of Clearcoat Coating Composition

A clearcoat composition is prepared by combining resin 1A and resin 1B in a 70/30 ratio based on solid resin, 20% by weight Cymel® 323 (from Cytec Industries) based on vehicle weight, 5% dimethylpyrazole blocked isocyanurate of hexamethylenediisocyanate based on vehicle weight, 1.2% dodecylbenzene sulfonic acid based on vehicle weight, 4.7% of an additive package based on vehicle weight, and the monomethyl ether of propylene glycol to produce a viscosity of 35 seconds on a #4 Ford Cup viscometer at 25° C.

The repair adhesion of the clearcoat coating composition of Example 2 is tested as follows. Test panels are prepared by priming previously electrocoated cold rolled steel panels. A commercially available primer (U28AK215 from BASF Corporation) is applied to an approximately 1.0 mil (25.4 microns) dry film thickness and then cured per manufacturer's recommended curing conditions. A commercially available waterborne black basecoat (E202KW706 from BASF Corporation) is then applied to the primed panel for a dry film build of from 0.6 to 0.7 mils (15.2–17.8 microns) and flashed for 5 minutes at 140° F. (60° C.). The clearcoat composition of Example 2 is then spray applied to the flashed basecoated panels in a dry film build wedge of from 0.1 to 2.0 mils (2.5–50.8 microns), flashed for 20 minutes at room temperature, and then cured for 90 minutes at 300° F. (149° C.) to simulate an overbake condition. A repair condition is simulated by the application of the previously applied black waterborne basecoat and clearcoat to the overbaked clearcoated panels. No scuff sanding or abrasion is provided to the overbaked clearcoated panels. The 'repair' basecoat composition is applied as indicated above followed by application of the clearcoat composition of Example 2 to the flashed but uncured basecoat. The clearcoat composition of Example 2 is applied to a dry film build of 2.0 mils (50.8 microns). The applied clearcoat layer is then flashed for 20 minutes at room temperature and baked for 15 minutes at 260° F. (127° C.).

Adhesion is evaluated per published General Motors test method GM 9071P. The results show excellent adhesion between the two topcoat layers ('original' basecoat-clearcoat composite and 'repair' basecoat-clearcoat composite).

The invention has been described in detail with reference to preferred embodiments thereof. It should be understood, however, that variations and modifications can be made within the spirit and scope of the invention.

What is claimed is:

1. A clearcoat coating composition, comprising
   (a) a first vinyl copolymer prepared from a monomer mixture including no more than about 35% by weight of nonfunctional monomers said first vinyl copolymer comprising carbamate functionality and hydroxyl functionality, wherein at least a part of said hydroxyl functionality is on monomer units including an optionally branched alkyl group having at least about six carbon atoms;
   (b) a second vinyl copolymer having hydroxyl functionality; and
   (c) a curing agent component comprising at least an aminoplast curing agent.

2. A clearcoat coating composition according to claim 1, wherein the hydroxyl functionality of the second vinyl polymer is at least in part primary hydroxyl functionality.

3. A clearcoat coating composition according to claim 1, wherein the curing agent component further comprises a polyisocyanate curing agent.

4. A clearcoat coating composition according to claim 3, wherein the polyisocyanate curing agent is blocked.

5. A clearcoat coating composition according to claim 1, wherein the carbamate functionality is primary carbamate functionality.

6. A clearcoat coating composition according to claim 1, wherein all of the monomer units of the first vinyl polymer having said hydroxyl functionality include an optionally branched alkyl group having at least about six carbon atoms.

7. A clearcoat coating composition according to claim 1, wherein the first vinyl copolymer is prepared from a monomer mixture including no more than about 20% by weight of nonfunctional monomers.

8. A clearcoat coating composition according to claim 1, wherein the first vinyl copolymer is prepared from a monomer mixture including no more than about 10% by weight of nonfunctional monomers.

9. A clearcoat coating composition according to claim 1, wherein at least about 65% by weight of the monomer units of the first vinyl copolymer have at least one of the carbamate functionality and hydroxyl functionality.

10. A clearcoat coating composition according to claim 1, wherein at least a part of the hydroxyl functionality of the first vinyl polymer is part of a moiety having a structure selected from the group consisting of

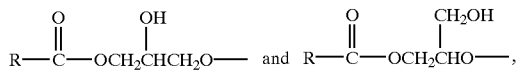

wherein R is an alkyl or cycloalkyl group having from about 6 to about 17 carbon atoms.

11. A clearcoat coating composition according to claim 10, wherein R is branched.

12. A clearcoat coating composition according to claim 1, wherein at least a part of the hydroxyl functionality of the first vinyl polymer is part of a moiety having a structure selected from the group consisting of

wherein R is an alkyl or cycloalkyl group having from about 4 to about 18 carbon atoms.

13. A clearcoat coating composition according to claim 12, wherein R is branched.

14. A clearcoat coating composition according to claim 1, wherein at least a part of the hydroxyl functionality of the first vinyl polymer is provided by the reaction of an optionally substituted cyclohexene oxide with a carboxylic acid group.

15. A clearcoat coating composition according to claim 1, wherein at least a part of the monomer units of the first vinyl polymer with hydroxyl functionality have a structure selected from the group consisting of

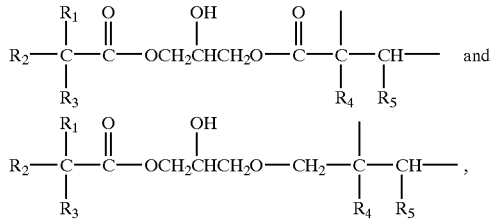

wherein $R_1$, $R_2$, and $R_3$ are each independently alkyl groups and wherein $R_1$, $R_2$, and $R_3$ together have a total of at least 8 carbon atoms, and further wherein $R_4$ and $R_5$ are either both H or one of $R_4$ and $R_5$ is a methyl group and the other is H.

16. A clearcoat coating composition according to claim 15, wherein at least one of $R_1$, $R_2$, and $R_3$ is methyl.

17. A clearcoat coating composition according to claim 15, wherein $R_1$, $R_2$, and $R_3$ together have up to about 16 carbon atoms.

18. A clearcoat coating composition according to claim 15, wherein $R_1$, $R_2$, and $R_3$ together have from 8 carbon atoms to about 10 carbon atoms.

19. A clearcoat coating composition according to claim 1, wherein the second vinyl copolymer has an hydroxyl equivalent weight of about 250 to about 400 grams per equivalent.

20. A clearcoat coating composition according to claim 1, comprising from about 50% to about 85% by weight of the first vinyl polymer based on vehicle weight.

21. A clearcoat coating composition according to claim 1, comprising from about 5% to about 40% by weight of the second vinyl polymer based on vehicle weight.

22. A clearcoat coating composition according to claim 1, comprising a further carbamate-functional compound.

23. A clearcoat coating composition according to claim 1, further comprising a carbamate-functional compound is the reaction product of
   (1) a compound comprising a primary carbamate group and an hydroxyl group and
   (2) a compound that is reactive with hydroxyl groups on a plurality of molecules of compound (1), but that is not reactive with the carbamate groups on compound (1).

24. A clearcoat coating composition according to claim 23, wherein compound (1) is a member selected from the group consisting of hydroxyethyl carbamate, hydroxypropyl carbamate, and hydroxybutyl carbamate.

25. A clearcoat coating composition according to claim 23, wherein compound (2) is a member selected from the group consisting of the isocyanurate of isophorone diisocyanate and the isocyanurate of hexamethylene diisocyanate.

26. A clearcoat coating composition according to claim 1, further comprising a carbamate-functional or urea-functional material comprising at least two functional groups, at least one of which is a carbamate or urea group that is the reaction product of
   (1) an hydroxyl group of a first compound that is the result of a ring-opening reaction between a compound with an epoxy group and a compound with an organic acid group and
   (2) cyanic acid or a carbamate or urea group-containing compound.

27. A clearcoat coating composition according to claim 1, further comprising a carbamate-functional or urea-functional material that is the reaction product of
   (1) a compound comprising a carbamate or urea group and an active hydrogen group that is reactive with (2), and
   (2) a lactone or a hydroxy carboxylic acid.

28. A clearcoat coating composition according to claim 1, further comprising a carbamate-functional or urea-functional material that is the reaction product of
   (A) the reaction product of
      (1) a compound comprising a primary carbamate or primary urea group and an hydroxyl group and
      (2) a lactone or a hydroxy carboxylic acid and
   (B) a compound that is reactive with hydroxyl groups on a plurality of molecules of compound (A), but that is not reactive with the carbamate or urea groups on compound (A).

29. A clearcoat coating composition according to claim 1, further comprising a carbamate-functional or urea-functional material that is the reaction product of
   (A) the reaction product of
      (1) a compound comprising a primary carbamate or primary urea group and an hydroxyl group and
      (2) a lactone or a hydroxy carboxylic acid and
   (B) a compound that converts an hydroxyl group on (A) to a carbamate group, or a compound comprising a group that is reactive with a hydroxyl group and a carbamate or urea group or group that can be converted to carbamate or urea.

30. A clearcoat coating composition according to claim 1, further comprising a carbamate-functional material that is the reaction product of
   (1) a first material that is the reaction product of a mixture including at least a polyisocyanate and an active hydrogen-containing chain extension agent with
   (2) a compound comprising a group that is reactive with said first material and a carbamate group or group that can be converted to a carbamate group.

31. A clearcoat coating composition according to claim 1, comprising a further material having at least two carbamate groups and a hydrocarbon moiety having about 24 to about 72 carbon atoms.

32. A clearcoat coating composition according to claim 31, wherein the further material has from two to four carbamate groups.

33. A clearcoat coating composition according to claim 31, wherein the further material has two carbamate groups.

34. A clearcoat coating composition according to claim 31, wherein the hydrocarbon moiety has from about 36 to about 72 carbon atoms.

35. A clearcoat coating composition according to claim 31, wherein the hydrocarbon moiety has from about 36 to about 54 carbon atoms.

36. A clearcoat coating composition according to claim 31, wherein the hydrocarbon moiety has about 36 carbon atoms.

37. A clearcoat coating composition according to claim 1, comprising a further material having a structure selected from the group consisting of

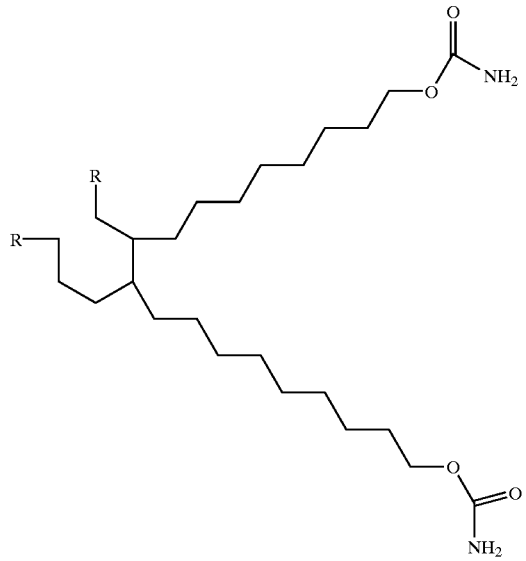

-continued
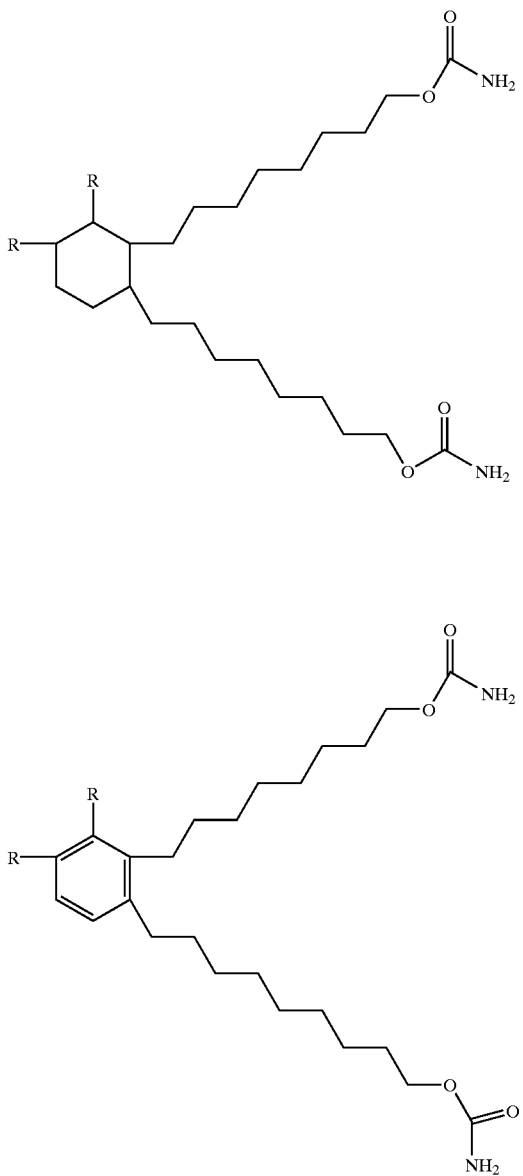
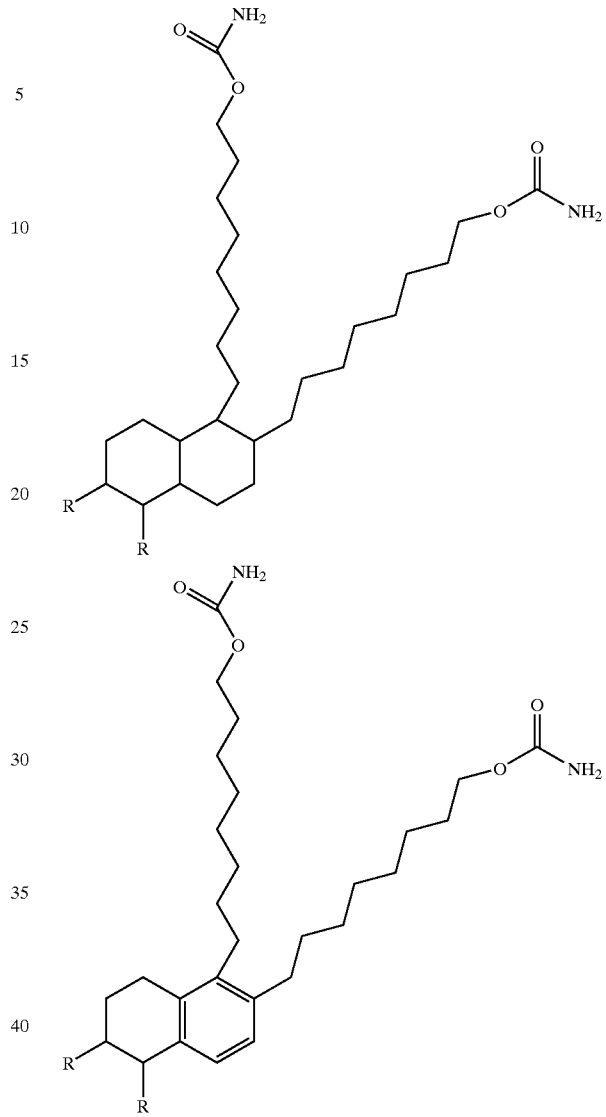
wherein each R group is independently an alkyl of 5 to 8 carbon atoms.
* * * * *